March 24, 1959 G. V. MUMFORD ET AL 2,878,520
METHOD FOR FORMING PLASTIC ARTICLES
Filed May 11, 1954 2 Sheets-Sheet 1
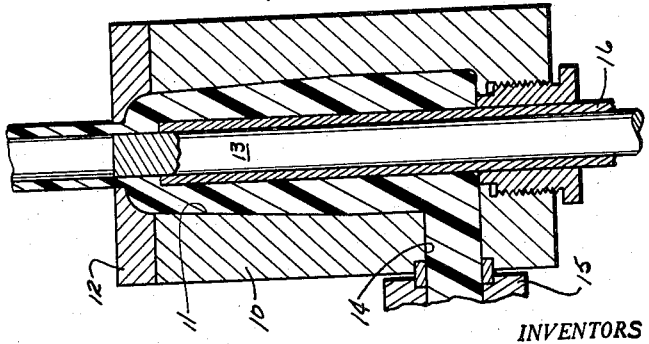
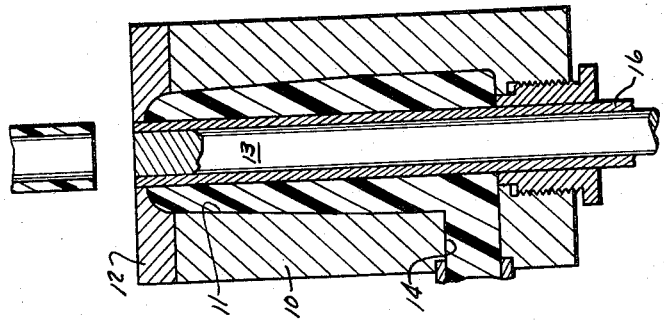
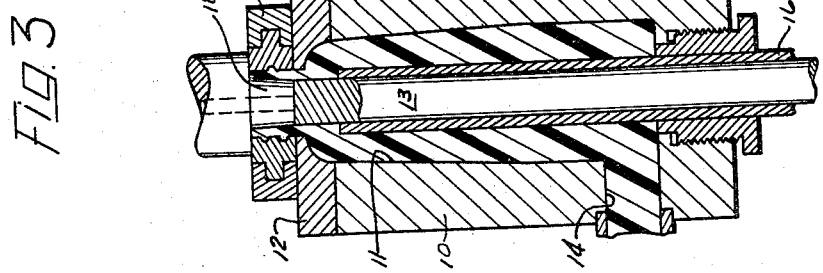
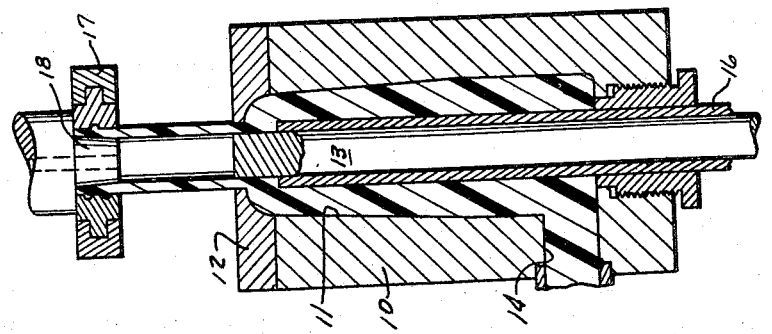
INVENTORS
GEORGE V. MUMFORD
BY LEONARD D. SOUBIER
W A Schaich
+ B C Husianes
ATTORNEYS March 24, 1959 G. V. MUMFORD ET AL 2,878,520
METHOD FOR FORMING PLASTIC ARTICLES
Filed May 11, 1954 2 Sheets-Sheet 2
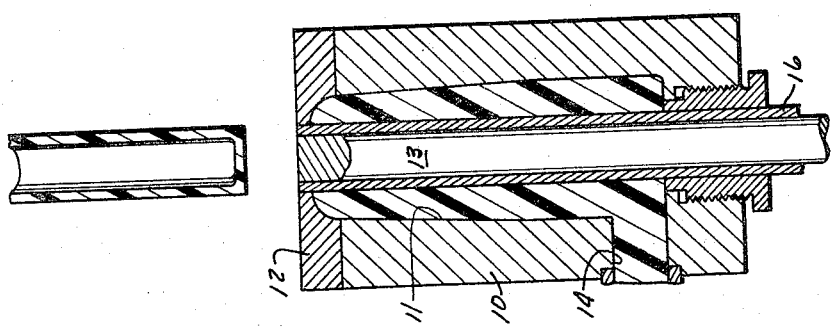
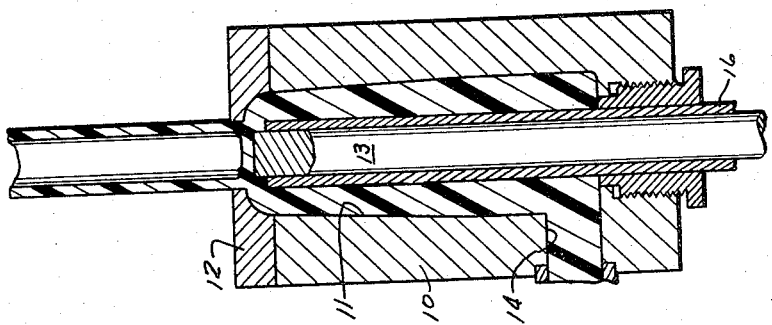
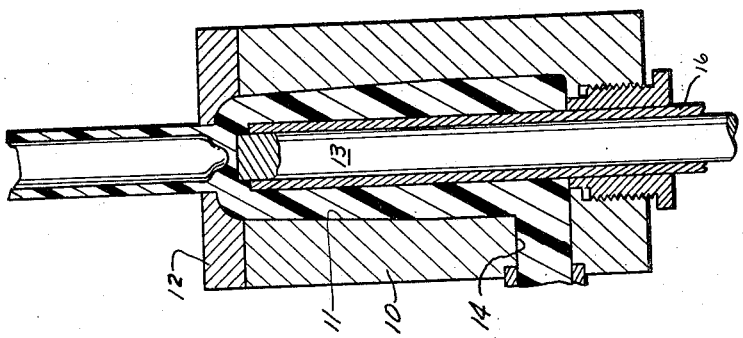
INVENTORS
GEORGE V. MUMFORD
BY LEONARD D. SOUBIER
W A Schaich
B C Toussiane
ATTORNEYS

United States Patent Office 2,878,520
Patented Mar. 24, 1959

2,878,520

METHOD FOR FORMING PLASTIC ARTICLES

George V. Mumford and Leonard D. Soubier, Toledo, Ohio, assignors to Owens-Illinois Glass Company, a corporation of Ohio Application May 11, 1954, Serial No. 428,914

3 Claims. (Cl. 18—55)

This invention relates to forming plastic articles and particularly to the forming of plastic articles wherein a part of the article is formed by forcing plastic material through an annular orifice.

It is an object of this invention to provide a method for forming plastic tubing wherein the end of the tubing is severed from the plastic material without waste or distortion of the tubing.

It is a further object of this invention to provide a method for forming plastic tubing with a transverse wall or bottom thereon without waste or trimming.

It is a further object of this invention to provide a method for forming plastic articles in completed form without any trimming being required.

Other objects of the invention will appear hereinafter.

Basically, the method comprises forming a length of plastic tubing by extrusion through an orifice, and severing the plastic tubing from the remaining plastic in the extruder body. More specifically the plastic material which is being extruded through an annular orifice, the orifice being formed by a mandrel positioned in the end of an open-ended cavity, is severed from the remaining plastic by a sleeve surrounding the mandrel and movable within the cavity into the annular orifice.

In addition the method provides forming a transverse wall or bottom on the tubing by momentarily retracting the mandrel within the cavity thereby permitting plastic material to flow around the end of the mandrel to form the transverse wall.

In addition the method provides for severing the tubing with the transverse wall formed therein by returning the mandrel to its original position within the end of the cavity and simultaneously moving the sleeve into the annular orifice.

The method further provides for the manufacture of a hollow plastic article wherein the neck of the article is first formed and then a length of tubing is formed integral with the neck, by forming a transverse wall on the tubing through retraction of the mandrel and severing said completed length of tubing with the transverse wall from the remaining plastic by returning the mandrel to its original position and moving the sleeve into the annular orifice through which the tube was extruded.

Referring to the accompanying drawings:

Figs. 1 and 2 are sectional elevational views of an apparatus showing the parts in various positions for extruding and severing a length of tubing;

Figs. 3 and 4 are sectional elevational views showing the apparatus in various positions for forming a portion of a plastic article; and Figs. 5, 6 and 7 are sectional elevational views of an apparatus showing the parts in various positions for forming a transverse wall or bottom on a length of tubing.

Referring to Fig. 1, the apparatus comprises a body 10 having an open-ended cavity 11 therein and an orifice plate 12 restricting the end of the cavity 11.

A mandrel 13 is positioned centrally of the cavity 11 and forms an annular orifice in cooperation with the plate 12. The body 10 is provided with a channel 14 through which plastic material under pressure may be supplied to the cavity from a source of plastic such as an extruder 15. A sleeve 16 surrounds the mandrel 13 in flush relationship and is vertically reciprocable within the cavity into and out of position of closing or sealing the annular orifice. The size and shape of the sleeve is such that when the end of the sleeve is in position in the annular orifice, plastic material is prevented from flowing out of the cavity.

According to one method, the sleeve 16 is normally in its lowered or retracted position permitting plastic material to flow out of the cavity through the annular orifice thereby forming plastic tubing. As the desired length of tubing is obtained, the sleeve 16 is moved within the cavity into the annular orifice thus severing the length of tubing which has been formed from the plastic material in the cavity. By retracting the sleeve 16 the formation of plastic tubing is reinitiated. Successive reciprocation of the sleeve at the desired times permits the formation of successive lengths of tubing, the ends of which are cleanly severed and undistorted and require no trimming.

A further modification of the method is shown in Figs. 5, 6 and 7 wherein a transverse wall or bottom is formed on the length of tubing as it is being extruded. Referring to Fig. 5, the mandrel 13 is momentarily retracted within the cavity permitting the plastic material to flow around the end of the mandrel thereby forming a transverse wall in the length of tubing. The bottomed tubing is thereafter severed by returning the mandrel 13 into flush relationship with the orifice plate 12 and simultaneously moving the sleeve 16 into the annular orifice.

According to a further modification of the method the transverse walls may be formed in the tubing without severing the tubing by momentarily retracting the mandrel 13 within the cavity and returning it to its original position, the sleeve being left in its original position.

It should be apparent that in the operation of the methods described in reference to Figs. 1, 2, 5, 6, and 7, where the end of the tubing is free, the extrusion is preferably conducted downwardly. On the other hand, the methods may be performed with the extrusion conducted horizontally, vertically or at another angle by guiding the end of the tubing by means of a suitable device.

According to a further modification of the method a plastic article may be formed which requires no finishing. This modification involved the adaptation of this invention to a known method of making hollow plastic articles wherein the neck of the article is first formed and then a length of tubular material is formed integral with the neck. According to this previous method the length of tubing is severed from the mass and then must be sealed either by marvering the end or by pinching the end between the halves of the mold. The neck with the integral length of tubing may be then expanded to the confines of the mold by applying fluid under pressure through the neck.

As shown in Figs. 3 and 4, a neck mold 17 having a core 18 therein, is brought into contact with the orifice plate 12 and plastic material is permitted to flow into the neck mold thereby forming the neck. The neck mold is then moved axially away from the orifice and material flows through the orifice forming a length of tubing integral with the neck.

As the desired length of tubing is formed the mandrel 13 is retracted thereby permitting plastic material to flow around the end of mandrel 13 forming a transverse wall or bottom on the tubing. The length of tubing with the transverse wall is severed from the remaining mass of plastic by returning the mandrel 13 to its original position and simultaneously moving the sleeve 16 into the orifice as shown in Figs. 6 and 7. The resultant article is complete and requires no trimming. In the alternative, the neck with the integral length of tubing and transverse bottom wall may be enclosed within the confines of a mold and expanded by the application of fluid under pressure through the core, to form a larger hollow article.

A further modification of the method is the provision of a neck with an integral length of tubing wherein the transverse wall is not formed but the length of tubing is severed from the remaining plastic material by moving the sleeve 16 into the annular orifice, the mandrel 13 being left in its original position.

The term "plastic" as used herein is intended to include any plastic material which is capable of acquiring the required degree of plasticity to permit its formation into tubing by passage through an annular orifice.

The terms "annular," "tubular," and "tubing" as used herein are intended to include various hollow shapes in which plastic material may be formed including circular and irregular shapes.

Modifications may be resorted to within the spirit and scope of the appended claims.

We claim:

1. In the method of forming a succession of hollow plastic articles wherein the neck of the article is first formed by injecting heated plastic material from an extruder cavity through the annular orifice opening thereof into a neck mold to form hollow finished neck portions in succession, said annular orifice being formed by a mandrel positioned and movable within the orifice opening formed at one end of the extruder cavity and through which the heated plastic material is supplied, said method including the steps of successively extruding from said orifice a hollow tubular formation integral with said formed neck, changing the form of said successive extrusions from a hollow tubular form to a solid rod form of extrusion, said change in said tubular formation occurring within the said cavity and severing the successive sealed formations within said cavity without interrupting the extrusion thereof from said cavity.

2. In the method of forming hollow plastic articles wherein the neck of the article is first formed by injecting heated plastic material from an extruder cavity through the annular orifice opening thereof into a neck mold to form a hollow finished neck portion, said annular orifice being formed by a mandrel positioned and movable within the orifice opening formed at one end of the extruder cavity and through which the heated plastic material is supplied, the steps of extruding from said orifice a hollow tubular formation integral with said formed neck, continuing said extrusion and concurrently changing from a hollow tubular form to a solid form of extrusion and thereby sealing said tubular formation within said cavity and severing said sealed formation within said cavity without interrupting the extrusion of said sealed formation from said cavity.

3. In the method of forming hollow plastic articles wherein the neck of the article is first formed by injecting heated plastic material from an extruder cavity through the annular orifice opening thereof into a neck mold to form a hollow finished neck portion, said annular orifice being formed by a mandrel positioned and movable within the orifice opening formed at one end of the extruder cavity and through which the heated plastic material is supplied, the steps of extruding from said orifice a hollow tubular formation in a direction parallel to the longitudinal axis of said orifice and cavity, said tubular extrusion being integral with said formed neck, continuing said parallel extrusion and concurrently changing the form of the extrusion from hollow tubular form to a solid form and concurrently forming within said cavity a seal for said tubular formation, severing said sealed formation within said cavity and continuing the extrusion of said sealed formation from said cavity.

References Cited in the file of this patent

UNITED STATES PATENTS

| | | |
|---|---|---|
| 1,205,839 | Balg | Nov. 21, 1916 |
| 2,175,053 | Ferngren | Oct. 3, 1939 |
| 2,262,612 | Kopitke | Nov. 11, 1941 |
| 2,288,454 | Hobson | June 30, 1942 |
| 2,349,178 | Kopitke | May 16, 1944 |
| 2,632,202 | Haines | Mar. 24, 1953 |
| 2,706,308 | Lorenz | Apr. 19, 1955 |
| 2,710,987 | Sherman | June 21, 1955 |